(12) United States Patent
Lin

(10) Patent No.: US 8,624,981 B2
(45) Date of Patent: Jan. 7, 2014

(54) TESTING METHOD FOR CAMERA

(75) Inventor: Yung-Feng Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 9 days.

(21) Appl. No.: 13/585,853

(22) Filed: Aug. 15, 2012

(65) Prior Publication Data

US 2013/0147968 A1 Jun. 13, 2013

(30) Foreign Application Priority Data

Dec. 13, 2011 (TW) .............................. 100145936 A

(51) Int. Cl.
*H04N 17/00* (2006.01)
*H04N 17/02* (2006.01)

(52) U.S. Cl.
USPC .......................................... 348/187; 348/184

(58) Field of Classification Search
USPC ................. 348/184, 180, 187, 188, 340, 357, 348/208.11, 208.2, 208.5, 174–175
IPC ............................................ H01N 17/00,17/02
See application file for complete search history.

(56) References Cited

U.S. PATENT DOCUMENTS

| | | | | |
|---|---|---|---|---|
| 7,629,998 B2 * | 12/2009 | Elberbaum | ................... | 348/187 |
| 7,693,411 B2 * | 4/2010 | Kwon et al. | .................. | 396/127 |
| 8,023,815 B2 * | 9/2011 | Yu et al. | ........................... | 396/90 |
| 8,073,317 B2 * | 12/2011 | Kitano | ............................ | 396/55 |
| 8,260,130 B2 * | 9/2012 | Wang | ............................. | 396/133 |
| 8,478,119 B2 * | 7/2013 | Heo | ............................... | 396/129 |

* cited by examiner

*Primary Examiner* — Trang U Tran
(74) *Attorney, Agent, or Firm* — Altis Law Group, Inc.

(57) ABSTRACT

A testing method includes: providing a camera under test and a planar light source having a first mark, wherein the camera includes a voice coil motor (VCM) and a lens module is fixed on the VCM by glue, the VCM moves the lens module, the VCM includes an elastic tab for limiting and restoring the movement of the lens module; taking an image of a light source using the camera during the movement of the VCM; displaying the image having the first mark; determining if the first mark tilts using a detector; displaying a first message indicating that the tab is not stuck by glue when the detector determines the first mark does not tilt; and displaying a second message indicating that the tab is stuck by glue when the detector determines the first mark tilts.

11 Claims, 4 Drawing Sheets

TESTING METHOD FOR CAMERA

BACKGROUND

1. Technical Field

The present disclosure relates to cameras and, more particularly, to a testing method for testing whether an elastic tab of a voice coil motor (VCM) of a camera is stuck by glue in a gluing process for fixing a lens module of the camera to the VCM.

2. Description of Related Art

VCMs are used to adjust a focus state of a camera. The VCM defines a through hole for receiving a lens module and includes elastic tabs at ends of the through holes for limiting and restoring movement of the lens module. The lens module is fixed to the VCM by gluing. However, during gluing, excess glue may flow out of the through hole which in turn may stick the tabs. As such, the tabs may not be able to deform and restore freely and accordingly the lens module may tilt as the tabs can not deform and restore freely, which in turn degrades quality of the camera.

Therefore, it is desirable to provide a testing method for testing whether or not an elastic tab of a VCM of a camera is stuck by glue.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments.

DETAILED DESCRIPTION

Embodiments of the present disclosure will be described below, with reference to the accompanying drawings.

Figure 1:
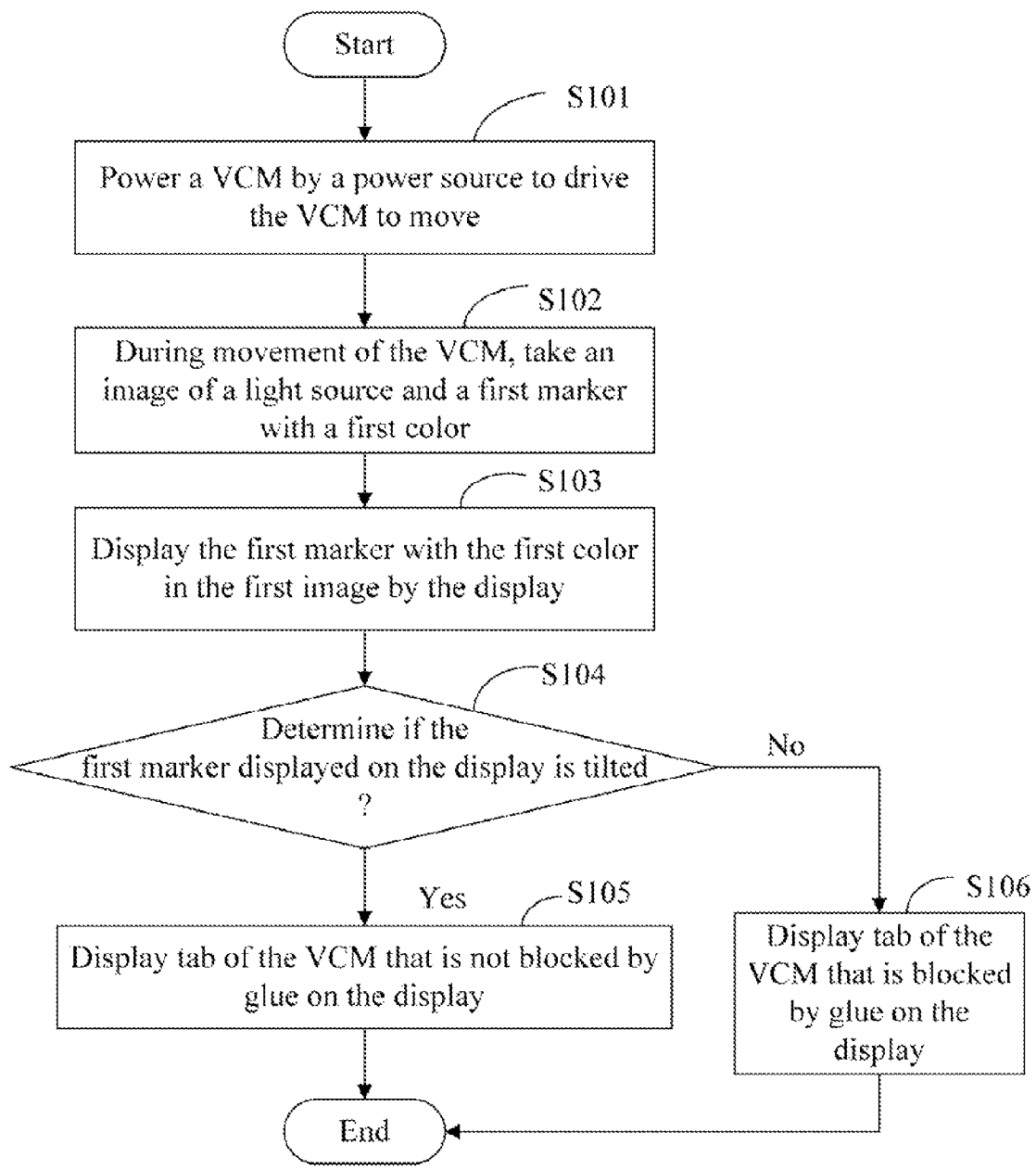
FIG. 1 is a flowchart of a testing method in accordance with the present disclosure.
Figure 2:
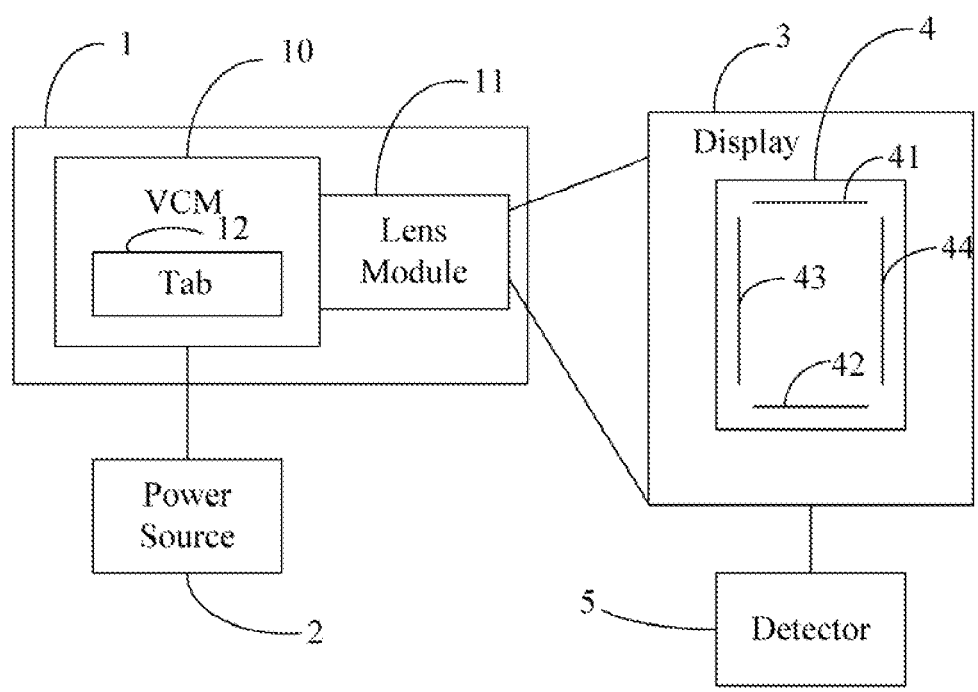
FIG. 2 is a schematic diagram showing how the testing method in FIG. 1 is implemented.

Referring to FIGS. 1 and 2, a testing method is provided.

In step S101, a camera 1 and a power source 2 are provided, wherein the camera 1 includes a VCM 10 and a lens module 11 is fixed on the VCM 10 by glue. The power source 2 powers the VCM 10, thereby driving the VCM 10 to move. The VCM 10 includes an elastic tab 12 for limiting and restoring the movement of the lens module 11. A planar light source 4 having a first mark 41 with a first color is also provided.

In step S102, the camera 1 takes an image of a light source 4 during the movement of the VCM 10. In this embodiment, the first mark 41 is positioned at an upper portion of the light source 4 and corresponds to an upper portion the tab 12. Alternatively, the first mark 41 can be positioned at other suitable positions of the light source 4, e.g., a lower, left, or right portion, and corresponds to other portion, e.g., a lower, left, or right portion, of the tab 12.

Figure 3:
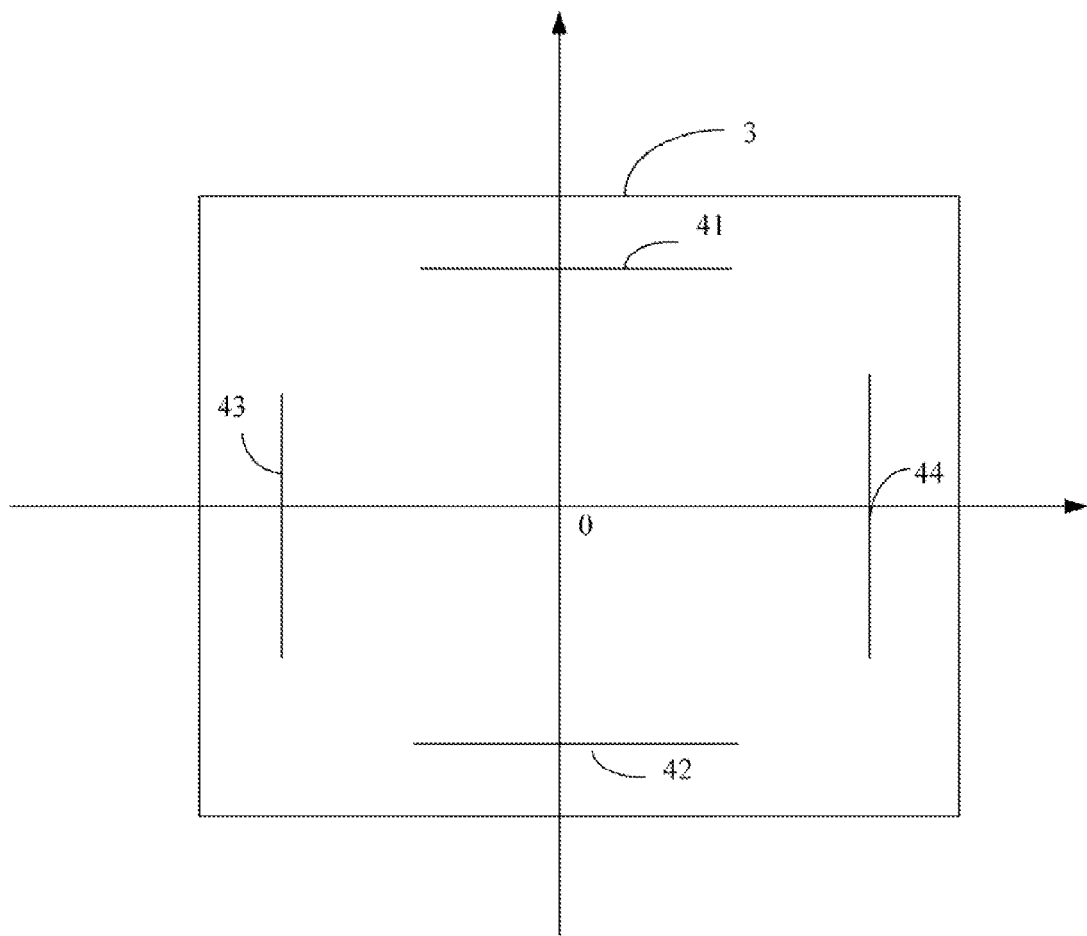
FIG. 3 is a schematic view of an image taken by a camera under test when an elastic tab in a VCM of the camera is not stuck by glue.
Figure 4:
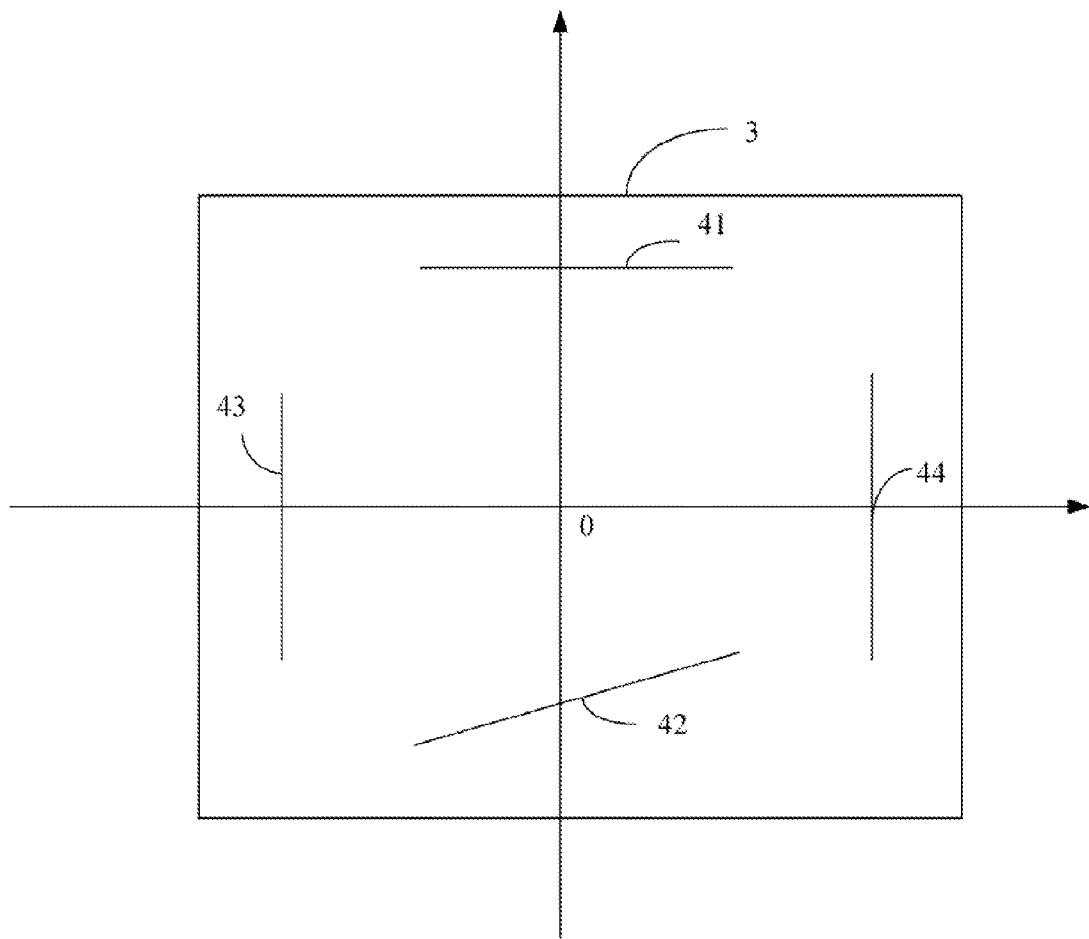
FIG. 4 is a schematic view of an image taken by the camera when the elastic tab in the VCM of the camera is stuck by glue.

In step S103, a display 3 is provided and displays the image having the first mark 41 with the first color, as shown in FIGS. 3 and 4.

In step S104, a detector 5 is provided and determines if the first mark 41 tilts. In this embodiment, the first mark 41 is a straight line and, accordingly, if the first mark 41 tilts can be determined by the following sub-steps: obtaining an included angle between the first mark 41 and the horizontal direction; acquiring a pixel of the first mark 41; taking the pixel as an origin and drawing a straight line extending from the origin at the obtained included angle in relative to the horizontal direction; detecting whether other pixels of the first mark 41 are on the straight line; and determining that the first mark 41 tilts if the other pixels of the first mark 41 are not all on the straight line or the first mark 41 does not tilt if the other pixels of the first mark 41 are all on the straight light.

In step S105, the display 3 displays a first message indicating that the tab 12 is not stuck by glue when the detector 5 determines the first mark 41 does not tilt as shown in FIG. 3. In principle, being stuck, the tab 12 is not able to deform and restore freely and accordingly the lens module 11 may tilt as the tab 12 can not deform and restore freely. In turn, the first mark 41 in the image of the light source 4 which is taken by the lens module 11 will tilt.

In step S106, the display 3 displays a second message indicating that the tab 12 is stuck by glue when the detector 5 determines the first mark 41 tilts.

In other embodiments, the light source 4 may include more than one marks positioned on both the upper, lower, left, and right portions of the light source 4 and correspond to the upper, lower, left, and right portions of the tab 12, respectively, to increase accuracy of the testing. Specifically, in addition to the first mark 41 with the first color, the light source 4 further includes a second mark 42 with a second color positioned at a lower portion of the light source 4 and corresponding to the lower portion of the tab 12, a third mark 43 with a third color positioned at a left portion of the light source 4 and corresponding to the left portion of the tab 12, and a fourth mark 44 with a fourth color positioned at a right portion of the light source 4 and corresponding to the right portion of the tab 12.

If the light source 4 further includes the second mark 42 with the second color, the testing method further includes following steps, after the detector 5 determines the first mark 41 does not tilt: the display 3 displays the second mark 42 with the second color; the detector 5 determines if the second mark 42 tilts; the display 3 displays the second message indicating that the tab 12 is stuck by glue when the detector 5 determines the second mark 42 tilts, as shown in FIG. 4, and the display 3 displays the first message indicating that the tab 12 is not stuck by glue when the detector 5 determines the second mark 42 does not tilt, as shown in FIG. 3.

If the light source 4 includes the third mark 43 with the third color as well, the testing method further includes following steps after the detector 5 determines the second mark 42 does not tilt, the display 3 displays the third mark 43 with the third color; the detector 5 determines if the third mark 43 tilts; the display 3 displays the second message indicating that the tab 12 is stuck by glue 3 when the detector 5 determines the third mark 43 tilts, and the display 3 displays the first message indicating that the tab 12 is not stuck by glue when the detector 5 determines the third mark 43 does not tilt.

If the light source 4 further includes the fourth mark 44 with the fourth color, the testing method further includes following steps after the detector 5 determines the third mark 43 is not tilted: the display 3 displays the fourth mark 44 with the fourth color; the detector 5 determines if the fourth mark 44 tilts; the display 3 displays the first message indicating that the tab 12 is not stuck by glue when the detector 5 determines the fourth mark 44 is not tilted, and the display 3 displays the second message that the tab 12 is stuck by glue when the detector 5 determines the fourth mark 44 is tilted.

If the second mark 42, the third mark 43, or the fourth mark 44 is tilted can be determined by the same steps for determining if the first mark 41 tilt. The first, second, third, and fourth color can be the same or different.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A testing method comprising:
   providing a camera under test, a power source, and a planar light source having a first mark with a first color, wherein the camera includes a voice coil motor (VCM) and a lens module is fixed on the VCM by glue, the power source is configured to power the VCM to drive the VCM moving the lens module, the VCM comprises an elastic tab for limiting and restoring the movement of the lens module;
   taking an image of the light source using the camera during the movement of the VCM;
   providing a display and displaying the image having the first mark with the first color using the display;
   providing a detector and determining if the first mark tilts using the detector;
   displaying a first message indicating that the tab is not stuck by glue when the detector determines the first mark does not tilt using the display; and
   displaying a second message indicating that the tab is stuck by glue when the detector determines the first mark tilts using the display.

2. The testing method of claim 1, wherein the first mark is positioned at an upper, lower, left, or right portion of the light source and corresponds to an upper, lower, left, or right portion the tab.

3. The testing method of claim 1, wherein the first mark is a straight line and if the first mark tilts can be determined by the following sub-steps:
   obtaining an included angle between the first mark and the horizontal direction;
   acquiring a pixel of the first mark;
   taking the pixel as an origin and drawing a straight line extending from the origin at the obtained included angle in relative to the horizontal direction;
   detecting whether other pixels of the first mark are on the straight line; and
   determining that the first mark tilts if the other pixels of the first mark are not all on the straight line or the first mark does not tilt if the other pixels of the first mark are all on the straight light.

4. The testing method of claim 1, wherein the light source comprises another three marks positioned on the lower, left, and right portion of the light source and correspond to the lower, left, and right portions of the tab, respectively.

5. The testing method of claim 4, wherein the light source further comprises a second mark with a second color positioned at a lower portion of the light source and corresponding to the lower portion of the tab.

6. The testing method of claim 5, further comprising, after the detector determines the first mark does not tilt:
   displaying the second mark with the second color using the display;
   determining if the second mark tilts using the detector;
   displaying the second message indicating that the tab is stuck by glue when the detector determines the second mark tilts using the display; and
   displaying the first message indicating that the tab is not stuck by glue when the detector determines the second mark does not tilt using the display.

7. The testing method of claim 6, wherein the light source further comprises a third mark with a third color positioned at a left portion of the light source and corresponding to the left portion of the tab.

8. The testing method of claim 7, further comprising, after the detector determines the second mark does not tilt:
   displaying the third mark with the third color using the display;
   determining if the third mark tilts using the detector;
   displaying the third message indicating that the tab is stuck by glue when the detector determines the third mark tilts using the display; and
   displaying the first message indicating that the tab is not stuck by glue when the detector determines the third mark does not tilt using the display.

9. The testing method of claim 8, wherein the light source further comprises a fourth mark with a fourth color positioned at a right portion of the light source and corresponding to the right portion of the tab.

10. The testing method of claim 9, further comprising, after the detector determines the third mark does not tilt:
    displaying the fourth mark with the fourth color using the display;
    determining if the fourth mark tilts using the detector;
    displaying the fourth message indicating that the tab is stuck by glue when the detector determines the fourth mark tilts using the display; and
    displaying the first message indicating that the tab is not stuck by glue when the detector determines the fourth mark does not tilt using the display.

11. The testing method of claim 9, wherein the first, second, third, and fourth colors are the same or different.

* * * * *